R. W. DOUGLASS.
HEAT EXCHANGER.
APPLICATION FILED JULY 27, 1920.
1,397,091.
Patented Nov. 15, 1921.
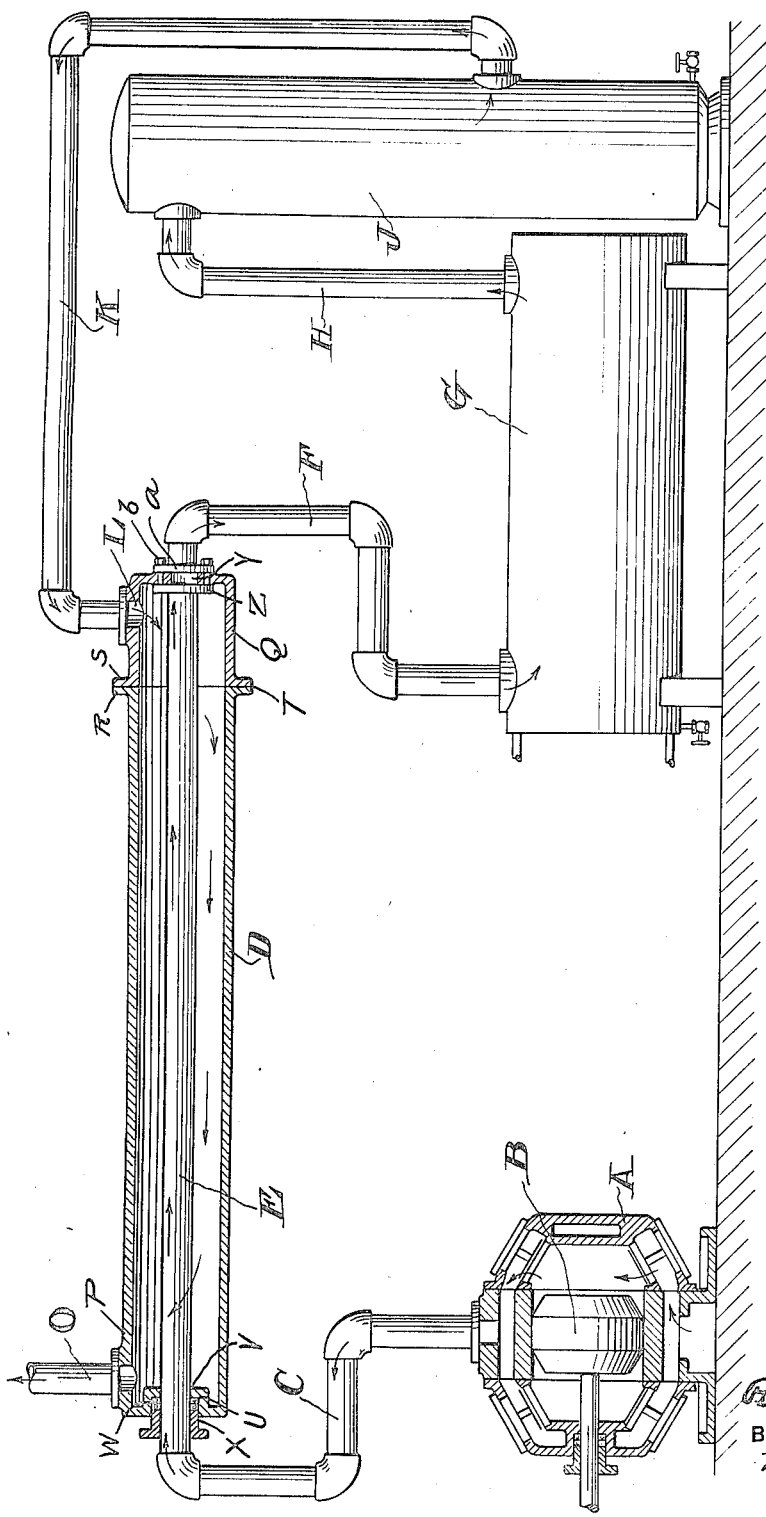
INVENTOR
Richard W. Douglass
BY
Herbert G. Ogden
his ATTORNEY

UNITED STATES PATENT OFFICE.

RICHARD W. DOUGLASS, OF WEST NEW BRIGHTON, NEW YORK, ASSIGNOR TO INGERSOLL-RAND COMPANY, OF JERSEY CITY, NEW JERSEY, A CORPORATION OF NEW JERSEY.

HEAT-EXCHANGER.

1,397,091.  Specification of Letters Patent.  Patented Nov. 15, 1921.

Application filed July 27, 1920. Serial No. 399,294.

*To all whom it may concern:*

Be it known that I, RICHARD W. DOUGLASS, a citizen of the United States, residing at West New Brighton, Staten Island, in the county of Richmond and State of New York, have invented certain new and useful Improvements in Heat-Exchangers, of which the following is a specification.

This invention relates to heat exchangers and particularly to a device of this character adaptable for use in unitary apparatus for compressing air or gas, and the primary object of the invention is to produce dry hot compressed air or gas for industrial purposes.

Another object of the invention is to enable a heat exchanger to accomplish the above by a regenerative method in which cooled dried air or gas is continuously heated, while at the same time the hot compressed air or gas is initially cooled, by transfer of heat from the hot compressed air or gas to the dried cooled air or gas.

A further object is to accomplish the above by a simple device embodying but few parts and which may be applied to existing air compressor installations without requiring more than a slight rearrangement of the piping.

One preferred form of apparatus for carrying out the invention is shown in the accompanying drawing which is a diagrammatic side elevation partly in longitudinal section of such apparatus.

Referring to the drawing, a compressor A of any suitable form having the reciprocating piston B, is connected by a pipe C to a heat exchanger or regenerator D shown in this instance in the form of a cylinder through which the compressed air pipe E leads to the pipe F connected to an aftercooler G of any suitable form in which the air or gas is cooled. From the aftercooler G the air or gas passes through the pipe H to the receiver J in which the moisture is substantially removed and from thence the pipe K leads back to the inlet L in the heat exchanger cylinder D so that the dried cooled air passes over and around the compressed air pipe E through the cylinder D to the outlet O, which is located at a point remote from the inlet L, from which outlet O dry hot compressed air may be piped to the work. The regenerator embodies in fact a concentric arrangement of the portion of the passage leading from the compressor to the aftercooler with a portion of the outlet passage, the concentric portion of the outlet passage being of increased diameter so that it forms a cylindrical casing with a chamber around the first named passage.

The cylinder or reheater casing D is constructed in novel and simple form. As shown it comprises two cylindrical sections P and Q having flanged ends R and S respectively adapted to be bolted or otherwise secured together at T to form the unitary casing D. The inlet L is positioned at the side of the section Q at a point remote from the joint T and the outlet O is similarly located at the side of the section P at a point remote from the joint T. The outer end of the section T is indented forming a cavity and is provided with an aperture V through which the pipe C passes. Packing W is placed in the cavity U around the pipe C and a gland X longitudinally movable in the cavity U is arranged to hold the packing W compressed around the pipe C and form a tight joint preventing the escape of air from the interior of the casing D. At the outer end of the section Q is an aperture Y through which the pipe C also passes. A flange Z on the pipe C inside the casing D abuts against the inner face of the outer end of the section Q and a similar flange *a* on the pipe C outside of the casing D abuts against the outer face of the outer end of the section Q, these flanges securing the end of the section Q tightly between them by means of a plurality of bolts *b*. The function of this construction is to prevent leakage at this end of the casing and also to prevent longitudinal movement of the pipe C in the casing D, which movement would prove deleterious in the operation of the device.

The cooled dried air preferably passes through the heat exchanger in the opposite direction to the flow of the hot compressed air or gas and the cooled dried air or gas is continuously and regeneratively finally heated while at the same time the hot compressed air or gas is initially cooled by transfer of heat from the hot compressed air or gas in pipe E to the cooled dried air or gas in the cylinder D, The apparatus is simple and cheap to manufacture and owing to the regenerative principle employed is economical in operation.

I claim—

1. In a heat exchanger for simultaneously and continuously cooling a hot medium and heating an oppositely flowing cool medium by heat interchange between said mediums, a single pipe for conveying one medium, a casing surrounding said pipe, said casing having an inlet and an outlet located at points remote from each other and being adapted to cause flow of a second medium at a different temperature through the casing and along and around the pipe conveying the first named medium in a direction counter to the flow of said first named medium, said conveying pipe having flanges abutting against the inner and outer faces of one end of the casing said flanges securing the end of the casing to prevent leakage and also preventing relative longitudinal movement between said pipe and casing, the opposite end of the casing adjacent the outlet having a packed joint around the discharge pipe to prevent leakage from the casing at said end.

2. In a heat exchanger for simultaneously and continuously cooling hot moist air or gas and reheating cooled dried air or gas by heat interchange between said mediums, a pipe for conveying one medium, a casing surrounding said pipe for a substantial portion of its length, said casing being composed of a plurality of sections and having an inlet and an outlet respectively in said sections said inlet and outlet being located at points remote from each other and being adapted to cause flow of another medium at a different temperature through the casing and along and around the conveying pipe for the first medium in a direction counter to the flow of said first named medium, said conveying pipe having a flange abutting against the inner end of one of the casing sections and a flange abutting against the outer end of said casing section, said flanges securing the end of the casing to prevent leakage and also preventing relative longitudinal movement between said pipe and casing, the opposite end of the casing adjacent the outlet having a packed joint around the conveying pipe to prevent leakage from the casing at said end.

In testimony whereof I have signed this specification.

RICHARD W. DOUGLASS.